US010456680B2

(12) United States Patent
Miron et al.

(10) Patent No.: US 10,456,680 B2
(45) Date of Patent: Oct. 29, 2019

(54) DETERMINING PLAY OF THE GAME BASED ON GAMEPLAY EVENTS

(71) Applicant: BLIZZARD ENTERTAINMENT, INC., Irvine, CA (US)

(72) Inventors: Keith Miron, Laguna Niguel, CA (US); Geoff Goodman, Laguna Hilla, CA (US)

(73) Assignee: Blizzard Entertainment, Inc., Irvine, CA (US)

( * ) Notice: Subject to any disclaimer, the term of this patent is extended or adjusted under 35 U.S.C. 154(b) by 197 days.

(21) Appl. No.: 15/374,523

(22) Filed: Dec. 9, 2016

(65) Prior Publication Data
US 2018/0161675 A1 Jun. 14, 2018

(51) Int. Cl.
| | |
|---|---|
| A63F 9/24 | (2006.01) |
| A63F 13/00 | (2014.01) |
| G06F 17/00 | (2019.01) |
| G06F 19/00 | (2018.01) |
| A63F 13/497 | (2014.01) |
| A63F 13/86 | (2014.01) |
| A63F 13/79 | (2014.01) |
| A63F 13/847 | (2014.01) |
| A63F 13/493 | (2014.01) |
| A63F 13/822 | (2014.01) |
| A63F 13/837 | (2014.01) |
| A63F 13/35 | (2014.01) |
| A63F 13/46 | (2014.01) |

(52) U.S. Cl.
CPC ............ *A63F 13/497* (2014.09); *A63F 13/35* (2014.09); *A63F 13/46* (2014.09); *A63F 13/493* (2014.09); *A63F 13/79* (2014.09); *A63F 13/822* (2014.09); *A63F 13/837* (2014.09); *A63F 13/847* (2014.09); *A63F 13/86* (2014.09)

(58) Field of Classification Search
CPC .............................. A63F 13/49; A63F 13/497
See application file for complete search history.

(56) References Cited

U.S. PATENT DOCUMENTS

| | | | |
|---|---|---|---|
| 6,699,127 B1 * | 3/2004 | Lobb ........................ | A63F 13/10 345/418 |
| 9,352,226 B2 * | 5/2016 | Miura ....................... | A63F 13/12 |
| 9,364,743 B2 * | 6/2016 | Miura ....................... | A63F 13/00 |
| 2012/0134651 A1 * | 5/2012 | Cottrell ................ | G11B 27/034 386/278 |

\* cited by examiner

*Primary Examiner* — Milap Shah
*Assistant Examiner* — Jason Pinheiro
(74) *Attorney, Agent, or Firm* — Hickman Palermo Becker Bingham LLP

(57) ABSTRACT

In an approach, a game server records events that occur within a match of a video game played using a plurality of game clients. After the match has concluded, the game server scores the events according to a plurality of criteria corresponding a plurality of play of the game categories. A sliding window is passed over the events in a number of increments. During each increment, the score for each event that falls within the sliding window is aggregated for each of the categories. The game server then selects a play of the game category and determines the top aggregated score for that category. Once determined, the game server sends one or more instructions to the game clients which causes the game clients to display a replay of the events that occurred during the time window increment corresponding to the top aggregated score for the selected category.

20 Claims, 8 Drawing Sheets

DETERMINING PLAY OF THE GAME BASED ON GAMEPLAY EVENTS

FIELD OF THE INVENTION

The present invention relates to techniques for identifying and displaying a play of the game that occurred during a match of video game.

BACKGROUND

As used herein, "video game" refers to any electronic game that involves human interaction with a user interface to generate visual and/or auditory feedback on a gaming device. The gaming device may be a general purpose computing device (computer, tablet, smartphone, etc.) that is programmed to execute the video game, or a special-purpose gaming machine or console.

Over the years a broad spectrum of games has been developed which span a plethora of different genres, such as role playing games, puzzle games, simulation games, first-person shooters, and so forth. In addition, different games allow for different levels of interactions between the various human participants. A single-player game is designed to elicit input from only one player throughout the course of the gaming session. Thus, the other characters or participants that the player encounters throughout the game consist solely of non-player characters (NPCs) controlled by one or more computer systems. By sharp contrast, in a multiplayer game, the player is confronted with characters or situations controlled by human participants in addition to or instead of NPCs. However, the format and degree of interaction between the human participants can vary greatly depending on the design of the particular game being played.

Competitive games are games that pit players against one another, often referred to as "Player vs. Player" or "PvP" games. One example of PvP games include first person shooters, such as Overwatch developed by Blizzard Entertainment, where teams consisting of six players fight each other in various match formats to eliminate characters on the opposing team, capture objectives, or escort payloads to various locations on the map. Another example of a PvP game are Multiplayer Online Battle Arenas (MOBAs), which typically involve players controlling "champion" characters displayed using third-person perspective which battle in teams against competing players for kills, gold, objectives, items, and so forth. In some cases, such as with Heroes of the Storm developed by Blizzard Entertainment, the champion characters are assisted by computer controlled NPCs which the player characters seek to aid in overcoming the defenses of the opposing team. However, competitive games can also sometimes take the form of "Player vs. Environment" or "PvE" games where instead of direct competition with other players, the competition comes in the form of which player performs the best at the objectives of the game. For example, one game may have a player character that is beset by waves of NPCs which increase in difficulty over time, thus the competitive aspect is how far a player can reach before becoming overwhelmed. As another example, in Massive Multiplayer Role Playing Games (MMORPGs), guilds of players often compete to be the first guild in the world or on their server to defeat new bosses introduced into the game. In some competitive gaming circles, there is even the phenomenon of "speed running", which is the practice of taking a normally non-competitive game and holding contests to determine which player can beat the game in the shortest amount of time.

Players enjoy games for many different reasons, some enjoy the storyline, and others enjoy the feeling of accomplishment obtained from defeating difficult challenges. However, another major factor that motivates players (especially in competitive games) is glory. Namely, the ability for a player to show off their skills and prove that they are a one man (or woman) apocalypse. Some games foster this aspect of player motivation by providing achievements which can be completed to reward cosmetic items allow one player to show their accomplishment to other players. Other games provide rankings and/or leader boards that allow players to compete to be displayed in association with a prominent icon, title, or position. However, the aforementioned mechanisms are passive, they allow a player to show off what they have accomplished, but does not allow the player to directly show off the gameplay that others would find impressive.

As a result of the lack of mechanisms within the game to display their skill, players often resort to third-party programs that allow their gameplay to be recorded or streamed for display to others. For example, popular programs such as Fraps or Open Broadcast Software (OBS) are often used by players to record their gameplay for upload or streaming to sites which publish the recorded content, such as YouTube or Twitch TV. However, while such programs allow players to display their skills to others, third-party programs also have inherent limitations. First and foremost, the third-party programs often require a significant amount of time to set up and must be explicitly activated each time the player begins a play session. Thus, if the program is not explicitly activated, any impressive plays made during the play session are lost. Furthermore, these programs tend to record until explicitly turned off, as a result, the space required to store the recorded gameplay can become quite large if the gameplay continues for hours on end. Streaming ameliorates this issue a bit in some cases by not retaining the streamed content after display to the viewers, but any particularly impressive plays are then lost thereafter if not recorded using a separate program. Furthermore, these programs capture the entirety of the gameplay of a given session. As a result, there may be long periods of times where nothing impressive happens within the game which can be tedious to watch. To combat this issue, many players who upload their recorded videos for others to watch significantly edit their videos to leave only the periods of most impressive gameplay, which is not possible to do manually in real time.

In the past there have been a few attempts to record gameplay using an in-game system to try to capture various impressive plays and display those plays to others participating in the game and/or to spectators of the game. For example, if the game is configured such that players must reach a threshold number of team kills to win, the game client may display the period of gameplay around the last kill that occurred during the game since this kill directly caused the victory for the player's team. However, there is no guarantee that the last kill is necessarily the most impressive play that was performed over the course of the game.

For instance, there may have been a situation earlier in the game where one player managed to survive and emerged victorious even while being severely outnumbered. Capturing only the last kill would not make it possible to display such cases which would be considered fart more impressive than a single kill that ended the game. As another example of a previous technique, the play that was most impressive over the course of the game (referred to herein as the "play of the game") has been determined by identifying the portion of gameplay where a player or team has received the highest number of kills within a set window of time.

However, depending on the game, player skill is not measured solely by kills. Many games split characters into different roles, such as characters who are focused on damage, support, tanking, defense, and so forth, many of which are not always capable of generating a large number of kills, but nonetheless can perform plays gamers would consider impressive. For instance, a support character may be able to heal teammates, render those teammates temporarily invulnerable, resurrecting their teammates, or any other abilities that work to ensure heroes never die (without a fight). Many would consider a play where a support character saves their team to be just as or even more impressive than ranking up a large kill streak. However, such plays cannot be represented using a scoring metric for plays that is based solely on kills.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
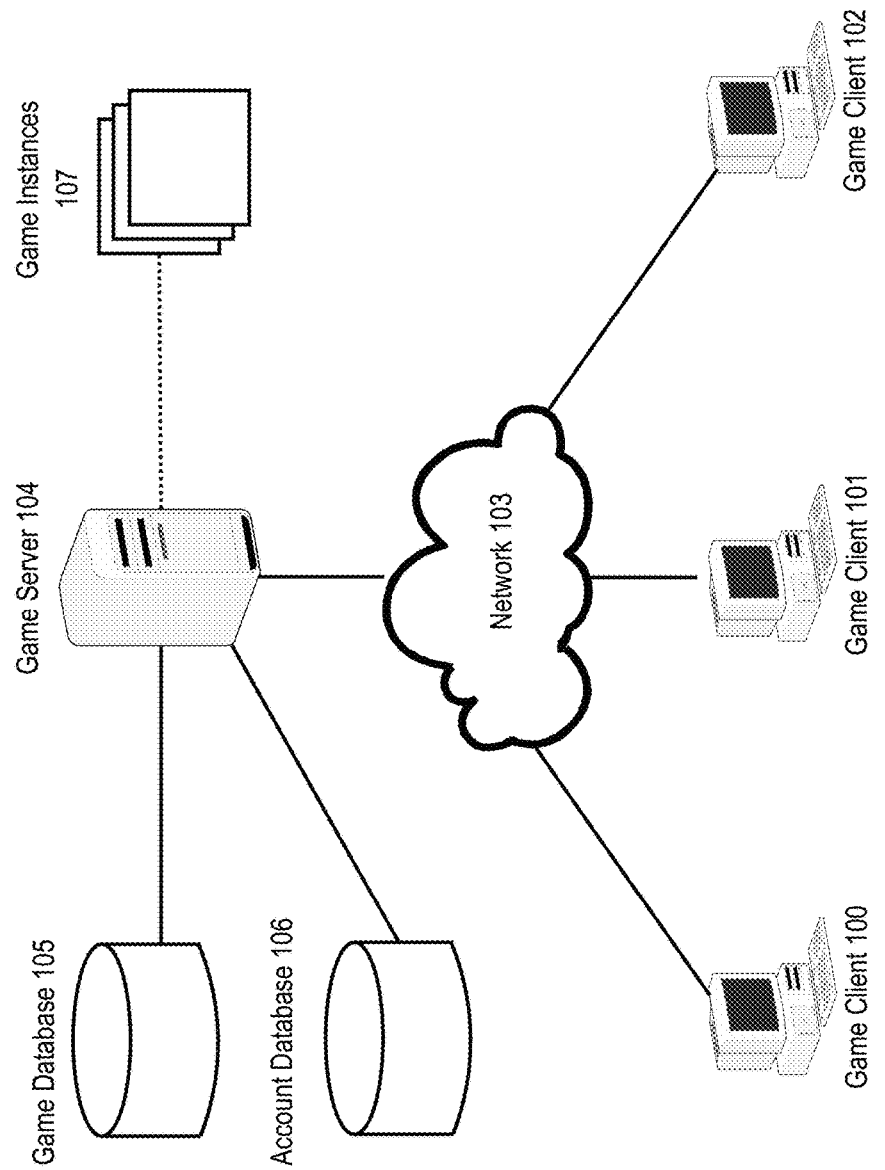
FIG. 1 illustrates an example operating environment upon which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Game Worlds and Instances
3.0 Example Operating Environment
4.0 Game Server Overview
5.0 Establishing a Game Instance
6.0 Controlling a Game Instance
7.0 Events
8.0 General Process Flow
   8.1 Scoring Events
      8.1.1 High Score
      8.1.2 Sharp Shooter
      8.1.3 Shutdown
      8.1.4 Life Saver
   8.2 Identifying the Play of the Game
   8.3 Displaying the Play of the Game
9.0 Combination Plays of the Game
10.0 Unlockables
11.0 Play of the Game Storage
12.0 Personal Play of the Game
13.0 Social Media Sharing
14.0 Extensions and Alternatives
15.0 Hardware Overview 1.0 General Overview Systems, methods, and stored instructions are provided herein for determining a play of the game. As discussed above, previous techniques for determining a play of the game have had flaws, such as not being able to capture impressive plays that do not involve a simple metric, such as number of kills that one player achieved in a window of time. Thus, using previous techniques, it is not possible to capture plays which involve saving teammates from deaths, skill shots (shots which require precise aiming), healing teammates at a critical time, capturing critical objectives, combination plays (where multiple characters are involved in the play), and so forth.

In an embodiment, over the course of the game, a plurality of game clients manned by the players submit commands to a game server that controls the game and determines the outcome of actions performed by the players during a match. As used herein, a "match" refers to any period of gameplay. Thus, both single-player and multi-player games have matches. Frequently, matches end in response to a victory condition (e.g. number of kills, objectives being captured, objects being escorted, and so forth) and may include a number of sub-matches, such as a best of X sub-matches victory condition. It is also common for matches to end in a failure condition (e.g. the player/team runs out of lives). A "match" may also correspond to a period of gameplay that involves a game event, such as a phase of a multi-phase adventure, a period during which players are battling a particular boss, or attempting to achieve a particular goal. Thus, "matches" may occur in persistent game worlds as well as game instances that have well-defined beginnings and ends.

According to one embodiment, when an action is performed, the game server adds the event to an event log and the event is tagged with a timecode. In some cases, information related to the outcome of the action may also be added to the event log in association with the event. Such information may include, but is not limited to, damage done, kills caused by the action, teammate saves caused by the action, whether one or more players affected by the action, whether one or more players involved in the event were airborne, whether one or more enemy players were prevented from performing an action by the event, and so forth.

When the match has been completed, the game server performs a pass over the event log and gives each event a plurality of scores. Each of the scores represents a different play of the game "category" and each category is associated with a different set of criteria used for scoring. For example, the category may include a "high score" category that is based on the number of kills or total damage caused by the event, a "life saver" category that is based on damage prevented to teammates, amount of healing done to teammates, or number of teammates whose life was saved by the event, a "sharpshooter" category that is based on difficulty of the shot (distance, whether one or more involved characters are airborne, whether a headshot was performed, and so forth), a "shutdown" category that is based on whether one player prevents another player from completing an important action, and so on. Thus, at the end of the pass, each event is given a score for each of the play of the game categories. However, in some cases certain types of events may not be applicable to certain categories. Not being given a score is considered the same as being given the score of zero for the categories that are not applicable. Furthermore, some events may have a score that is based on events that occur afterwards. For instance, one character may have a special ability that allows them to improve the health and damage of a teammate for a short period of time. Abilities which improve the combat capabilities of a teammate or themselves is hereinafter referred to as a "buff". The score given to the event of buffing the teammate may be based on the performance of that teammate immediately afterwards. Thus, the "high score" for the event causing the buff may also include the "high score" of the events performed by the buffed player for the duration of the buff. Therefore, some events may be scored based on events that occur some period of time afterwards.

After the scores for each event has been determined, the game server passes a sliding window (representing a period of time) from the time representing the beginning of the match to the time representing the end of the match. At each increment of the sliding window, the game server determines which events in the event log fall within the sliding window. The scores for each play of the game category are then aggregated over the identified events. The aggregation may occur per player or per team depending on the embodiment. For example, the goal may be to determine the best play of the game by a player that participated in the match. In that case, the aggregation may be performed by accumulating the score for each event that falls within the sliding window for each category on a per player basis. Thus, the accumulation only occurs across the events caused by each individual player. As another example, the goal may be to determine a play of the game that is caused by two or more players or even an entire team. Thus, the accumulation may occur over events caused by various combinations of players or all players within a team.

In some embodiments, the game server keeps track of the best score for each of the play of the game categories as the sliding window is passed over the events and the window of time that was aggregated over for that score. In cases where the accumulation is performed over events belonging to a particular player or combination of players, those players are also associated with the best score for each of the play of the game categories. Thus, at the end, the best score and associated time period for each of the play of the game categories is known.

Once the best score for each of the play of the game categories is known, the game server selects one of the play of the game categories to display for the match. In some embodiments, the game server may select the play of the game category that corresponds to the maximum of the best scores among the play of the game categories. However, other embodiments may skew the selection towards certain categories that, on average, produce more exciting plays, such as the high score category. For example, if the high score category is below a threshold score, the top score among the remaining play of the game categories may be selected instead.

In response to selecting a play of the game category, the game server sends one or more messages to the game clients which identify the time period to use when displaying the play of the game. Each game client, in response, displays the portion of the match corresponding to that time period. In some cases, the messages may also identify the player or players who caused the events, thus prompting the camera for the game to display the events from the perspective(s) of the identified player or players. However, in other embodiments, the camera may be displayed in third person perspective focused around the locations where the events occurred within the game.

The technique described above assumes that the game clients also maintain a log or video record of the events that can then be used to display a clip of the match corresponding to the time period identified by the server. However, in other embodiments, the game server may determine the play of the game, render the clip, and then stream the clip to the game clients. Alternatively, the game server may send the recorded events to the game clients for replay. For example, the server may generate a replay reel identifying a start time and a duration of the reel. The replay reel contains all the network events sent from the server to the clients for the requested duration as well as a preferred player to watch. Once the server has generated the replay reel, the server can transfer the replay reel down to the clients involved in the match, which then causes the clients to display the reel back to the players, simulating the play with the camera using the perspective of the preferred player. In some embodiments, the events represented in the replay reel contain information identifying the position of the characters at each "tick" or interval of time so that the game clients can simulate their movements during replay. However, in other embodiments, the events represented in the replay reel may contain the direction and length of movement of characters and/or objects at each time interval with the replay reel providing an initial state of the game world that is subsequently modified by the events during the replay. Furthermore, in some cases the game server may not be involved in determining the play of the game at all, instead each client maintains their own event log and performs the same scoring and play of the game selection that would otherwise be performed by the game server.

In some embodiments, the game clients may add an introduction reel to the play of the game identifying the players involved and/or identifying the play of the game category selected. In addition, one or more filters or camera techniques may be added to the clip. For example, a sharpshooter play of the game may insert a slow motion camera that follows the bullet across the battlefield. Depending on the embodiment, these special effects may be indicated in the commands sent to the game clients or the game clients may be configured to independently add such effects.

In some embodiments, the game server also stores the play of the game in non-volatile storage for archival purposes. For example, each week the top rated scores for the matches occurring during that week may be uploaded to a website that displays the clips, rankings, and players involved for dissemination to viewers. In other embodiments, instead of simply determining the "top" play of the game, the game server may determine the "top" play for each player individually. Thus, the game client for each player may allow those players to save those plays for later review. These individualized plays may be maintained temporarily by the game client and removed when the game client is shut down, or may be stored in non-volatile storage for later use.

2.0 Game Worlds, Instances, and Matches

As used herein, a "game world" is a template for the context in which the players experience the game. For example, the game world may define the geometric characteristics of a map in which the game takes place, the computer-controlled NPCs that appear on the map, scripted events, objects that appear in the map, dialog for the NPCs, cut-scenes, game logic, and so forth. A "game instance" is an instantiated copy of the game world that keeps track of the current context. For example, the game instance may track the current position of the player and non-player characters, current attributes of the characters (e.g. health, action points, stamina, mana, status effects, etc.), current object states, and so forth. Thus, the game world acts as a blueprint from which the gaming server/client generates and controls a playable copy of the game for the player to experience. As a result, different players may be playing in different "instances" of the game, but are still playing within the same "game world". In a practical environment, the "game world" and "game instances" of an electronic game may be implemented by stored data, stored instructions, specialized hardware, general computing hardware, or combinations thereof.

Depending on the embodiment, the game world can be deterministic (causes generation of the same exact game instance each time), stochastic (generates random characteristics for the game instance), or a combination of both. For example, the game world may define that a particular area within the game always use the same tile set giving the appearance of a cave. However, the enemies populating the area, the size of the area, the objects found within that area, the number of rooms, the configuration of the rooms, the size of the rooms, and so forth, may be fully or partially randomized. Thus, different instances of the same game world may not always be exactly identical. However, as is common with competitive games, the game world may be represented by a set map or arena within which the players experience the game. For instance, a first person shooter may have a selection of 5-15 maps representing different arenas that the players can battle within. When the match begins the game server selects one of the maps, generates the instance for that map, and then causes the game clients to load the players into a visual representation of the generated instance. In such cases, there may be many instances of the same map that are being run concurrently by the game server, each with different sets of players participating within the instance.

In some embodiments, players can save the state of a particular instance to resume again at a later time. Depending on the embodiment, the state of the instance may be completely saved, such that the context is identical to where the player left off, or partially saved, such that only particular aspects of the context are carried over from the prior gaming session. For example, the player's character and progress through the map may be saved for the next time play is resumed, but the non-player characters populating the map may be reset each time the instance is regenerated. However, other types of games may have limited or no ability to save the game state, as is common in match-based games such as first person shooters and multiplayer online battle arenas.

Depending on the embodiment, a "match" within the game may take place over multiple instances or within the same instance of the game world. For example, a first person shooter may use multiple maps for the same match, each representing a different round or sub-match, such as using a "best of X rounds" as the criteria for determining the winner. Thus, in some embodiments, each round or sub-match may take place within a new instance representing different maps or arenas. However, other games may generate a single instance that instantiates all the maps used for the match with the players being "teleported" or otherwise moved between the areas representing the different maps.

3.0 Example Operating Environment

FIG. 1 illustrates an example operating environment upon which an embodiment can be implemented. As shown, a game server 104 hosts game instances 107 for game client 100, game client 101, and game client 102 (collectively "the game clients") and is communicatively coupled to the game clients over network 103. In addition, the game server 104 is communicatively coupled to game world database 105, which contains data associated with generating and controlling game instances, and account database 106, which contains data associated with registered gaming accounts.

In an embodiment, the game clients and the game server 104 represent one or more software components or applications executing on respective computing devices, such as personal computers, workstations, laptops, netbooks, tablet computers, game consoles, smartphones, combinations thereof, and so forth. For example, the game clients may be executing on computing devices associated with individual players and the game server 104 may be executing on one or more computing devices associated with the game publisher or developer. However, in other embodiments, the game clients and the game server 104 may be implemented by specialized hardware instead of or in addition to the aforementioned software components and/or applications.

In an embodiment, network 103 represents any combination of one or more local networks, wide area networks, or internetworks. Data exchanged over the networks may be transferred using any number of network layer protocols, such as Internet Protocol (IP), Multiprotocol Label Switching (MPLS), Asynchronous Transfer Mode (ATM), Frame Relay, and so forth. Furthermore, in embodiments where the networks represent a combination of multiple sub-networks, different network layer protocols may be used at each of the underlying sub-networks.

In an embodiment, the game world database 105 and account database 106 each represent a collection of one or more storage devices. The game world database 105 stores data associated with generating and controlling game instances, such as the maps on which the game takes place, enemy NPCs, friendly NPCs, player and NPC abilities, scripted events, cut scene breakpoints, geometric characteristics of the map, objects, object interactions, and so forth. In addition, the game world database 105 stores the game logic which controls how the game reacts to various input or actions supplied by the players. The account database 106 stores data associated with one or more accounts, such as authentication information for each account, "friends" of each account, characters associated with each account, saved games associated with each account, game progress associated with each account, rankings for the account, mail/message data for each account, skins and/or cosmetic items unlocked by the account, and so forth.

Although FIG. 1 depicts only a particular number of elements, a practical environment may contain hundreds or thousands of each depicted element. In addition, a practical environment may contain additional components which have been omitted from FIG. 1 to avoid obscuring the illustration. For example, the game world database 105 and account database 106 may be communicatively coupled to or accessible by the game server 104 over one or more additional networks or by network 103. In addition, other embodiments may contain a different number of databases than illustrated in FIG. 1. For example, an account established with the game server 104 may be shared among multiple games from the same developer or publisher. Thus, the data in the account database 106 may be divided into a global account database that maintains information that is shared among the multiple games and multiple game specific account database that stores account data unique to each game. For example, the global account database may keep track of the authentication information for a given account, whereas the game specific database tracks the playable characters that are accessible to the account in a particular game. Furthermore, the game server 104 may be divided into multiple game servers that are each responsible for a subset of the responsibilities for the game server 104. For example, the environment may contain an authentication server that is responsible for authenticating the game clients when an account is accessed. As another example, the game server 104 may make use of a separate set of instance servers, where the game server 104 queues players looking for a match, matches those players with other players also looking for a match, and then invokes a game instance server to create an instance for the match and handle messages from the game clients related to controlling characters within the instance until the match has concluded.

4.0 Game Server Overview

Figure 2:
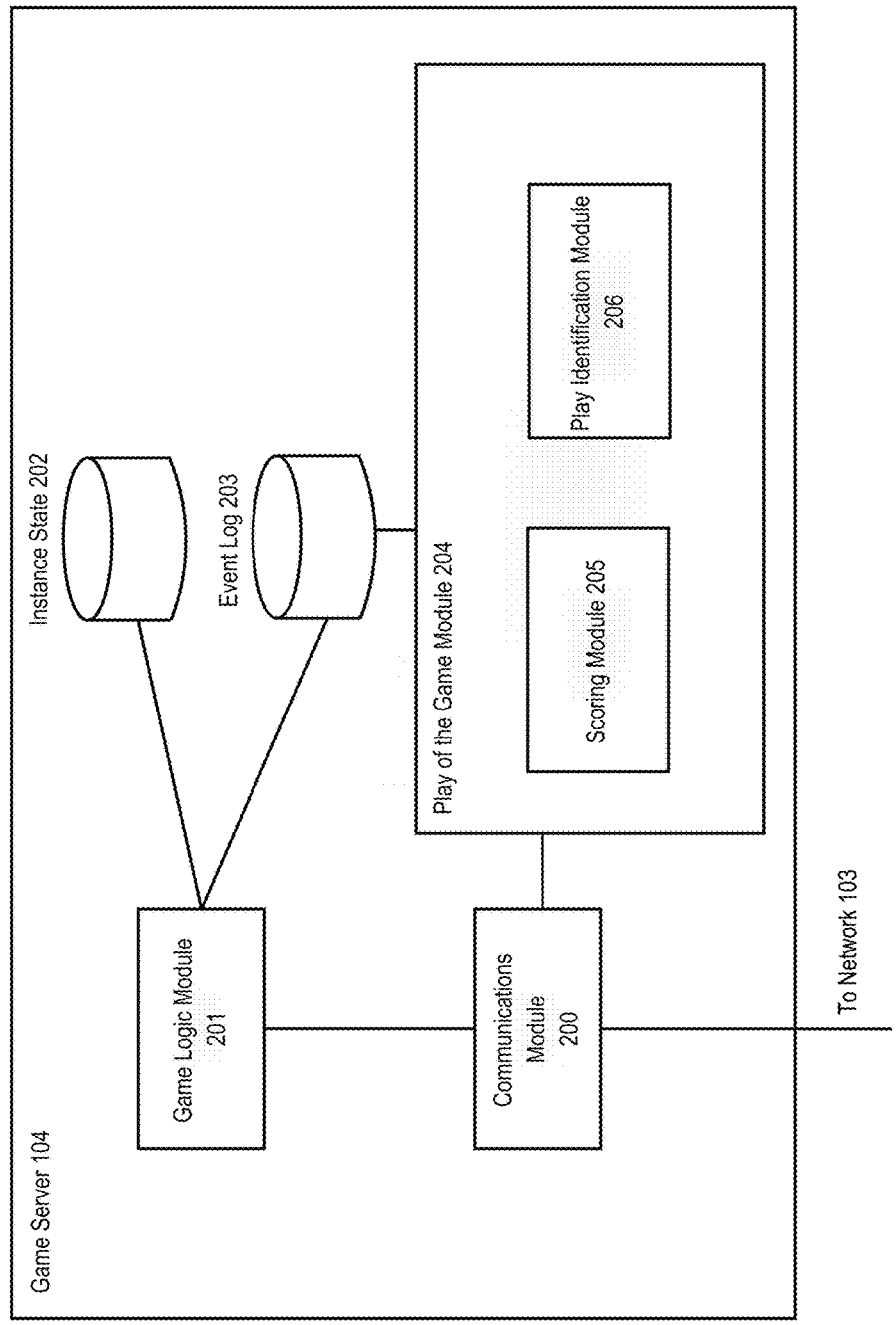
FIG. 2 illustrates an example game server according to an embodiment.

FIG. 2 illustrates an example game server according to an embodiment. FIG. 2 is represented using a number of "modules" representing the logic used to drive various features of the game server 104. The modules may be implemented using software instructions which are then executed by one or more processors of the game server 104 (not depicted), by specialized hardware such as field-programmable gate arrays, or by a combination of software and specialized hardware components. Although FIG. 2 depicts a particular number of each illustrated element, other embodiments may add additional elements, remove elements, divide out elements into additional sub-elements, or combine elements compared to FIG. 2. Furthermore, to clearly illustrate the game server 104, only those components related to a single game instance are depicted, such as only showing one instance state 202 and event log 203 maintained by the game server 104. In a practical environment, the game server 104 may host many instances concurrently, each with their own instance state 202 and event log 203.

In FIG. 2, the game server 104 includes communications module 200, game logic module 201, instance state 202, event log 203 and play of the game module 204.

In an embodiment, the communications module 200 represents a component of the game server 104 responsible for handling communications from the game clients. For example, the messages sent by the game clients may represent requests to join instances of the game and/or messages representing instructions for characters controlled by the game clients. Thus, the communications module 200 receives the messages from the game clients, parses the messages, and passes the relevant information and instructions to other modules of the game server 104. For example, the communications module may implement communications with the game clients using a number of different network, transport, and application layer protocols, such as UDP/TCP, IP, SSL, HTTP, SMNP, proprietary protocols, and so forth. The exact protocols used by the communications module 200 to communicate with the game clients is not critical and may vary across different embodiments.

In an embodiment, the game logic module 201 represents a component of the game server 104 responsible for creating and managing one or more instances of the game world.

Additional details regarding how embodiments establish and control a game instance is described in more detail below in Section 5.0 and Section 6.0. The state for a game instance is represented by instance state 202, which may be stored within volatile storage, such as RAM, or non-volatile storage, such as a collection of disk drives, or cloud storage. The state may include characteristics of the game state, such as the location and condition of characters within the instance, location or objectives or objects within the instance, the current score for each team, projectiles that are traveling within the world, and so forth. As the game logic module 201 receives instructions from the game clients via the communications module 200, the game logic module 201 updates the instance state 202 according to the rules of the game and communicates the updates to the game clients via the communications module 200. The rules of the game may be hard-coded into the game logic module 201, or may be read from another source such as a configuration file, or a combination of both hard-coded rules and variables read from a configuration file. In some embodiments, the game world database 105 stores an executable program which, when executed by the game server 104, causes the game server 104 to run the modules depicted in FIG. 2, such as the game logic module 201. In an embodiment, the game logic module 201 keeps track of events which occur within the game, such as actions performed by players, and stores data describing the events in event log 203. The events and the event log 203 are described in more detail below in Section 7.0. In some embodiments, the event log 203 for a given instance is erased when the match has been concluded and the play of the game has been displayed to save storage space.

In an embodiment, the play of the game module 204 is a component of the game server 104 responsible for identifying a play of the game and communicating the play of the game to the game clients. In some embodiments, the play of the game module 204 includes scoring module 205 and play identification module 206.

The scoring module 205 is a component of the play of the game module 204 that evaluates events in the event log 203 and determines scores for that event. In an embodiment, there are multiple categories for plays of the game which are scored based on different criteria. In an embodiment, the scoring module 205 provides a score for each event for each of the different categories of play of the game. However, some categories may not be applicable to certain events and thus the event may not be given an explicit score for that category. For the purpose of assigning a score, not having a score for a category is presumed to indicate that the event has the lowest score possible for that category.

Once the scoring module 205 has scored the events in the event log 203 for the match, the play identification module 206 is invoked to determine the period of gameplay which represents the most impressive play. In an embodiment, the play identification module 206 passes a sliding window from the starting time of the match to the ending time of the match. At each increment of the sliding window, the play identification module 206 identifies the events that occurred within that window of time. The play identification module 206 then performs aggregations over the scores associated with those events to determine an aggregated score for each play of the game category. In some embodiments, the aggregation may be keyed off players, groups of players, or entire teams. For instance, if the goal is to find the best play made by a player over the course of the match, the aggregation may be performed over events caused by individual players. However, if the goal is to find the best play made by a team, the aggregation may be performed over events caused by all players on the team. The same concept also applies to different permutations of players to determine play of the games involving more than one player, but less than a full team of players.

Once the aggregations over the different increments of the time window have been calculated, the play identification module 206 selects a play of the game category to display. For example, the selected play of the game category may be the category associated with the highest aggregated score across the time window increments. However, in other cases, the play of the game may be skewed towards certain categories. For instance, if a primary category has an aggregated score that is under a predetermined threshold (and is thus there is no play in that category that is sufficiently impressive), the highest among the secondary categories may then be chosen instead.

Once the play of the game category has been chosen, the play identification module 206 determines the top aggregated score within the selected category and the time window increment associated with the top aggregated score. The associated time window is then considered to be the play of the game that is to be displayed via the game clients. In an embodiment, the play identification module 206 sends one or more messages through the communications module 200 to the game clients that causes each game client to display a portion of the gameplay of the match corresponding to the time window increment. For example, in some embodiments the messages may simply include the beginning and end time of the window. However, this assumes that the game clients each maintain their own event log and are able to replay the events of the play of the game for the player to view. In other embodiments, the game server 104 streams a video clip of the play to the game clients for display or sends messages identifying the appropriate state of the game world at the beginning of the play and walk through the events. In still other embodiments, the game server 104 sends a replay reel containing the network events that occurred over the window of time representing the play of the game and a preferred player to the game clients. The game clients, upon receiving the replay reel then display the events contained in the replay reel from the perspective of the preferred player. Thus, in these examples, there is no requirement for the game clients to maintain their own log of the events that occurred within the game.

In some cases, the play may be displayed using a first person perspective of the player or players which caused the events of the play of the game. In such cases, the messages may identify the player or players and specify which times within the play should be displayed from each of the identified player's perspectives. Furthermore, the game clients or the game server 104 may cause modifications to the displayed clip of the play of the game, such as adding different camera filters or special effects. For instance, a "sharpshooter" play of the game may trace or highlight the path of a bullet shot by a sniper character.

5.0 Establishing a Game Instance

In an embodiment, the game clients establish a game instance with the game server 104 by "logging in" to an account and requesting an instance. For example, the game client may log into an account by providing one or more credentials such as passwords, account names, secret codes, authenticator codes, and so forth. The game server 104 compares the credentials to data associated with the account within the account database 106 and if a match is found the game server 104 allows access to the account. For example, the game server 104 may send information from the account database 106 to the requesting game client for display, such as characters available for play on the account, available game modes, online status of friends and/or guildmates associated with the account, and so forth. In addition, once access to the account has been granted, the requesting game client provides an option, via a user interface, widget, or other input mechanism, that allows the associated player to request a game instance. In some embodiments, the game client sends additional information with the request that is used by the game server 104 to generate the game instance. For example, the account may be associated with multiple characters which can be selected by the player via a user interface provided by the requesting game client. Thus, the requesting game client sends with the request an identifier indicating which character will be played. However, in other embodiments, the game server may wait until the game client has generated an instance of the game world before obtaining information from the game client as to which character the associated player will use. Furthermore, the game may support multiple game modes, such as a ranked mode, an unranked mode, a mode with a special theme that changes every week, and so forth. Thus, the game client may send the selected play mode to the game server to assist with generating or locating a suitable instance in which to place the player.

The game server 104 responds to the request either by locating an already existing instance into which to place the player, by generating a new instance, or by queueing the player to be placed into an instance at a later time. In games that involve persistent worlds, a player may simply pick an existing instance of the world, or automatically join an instance based on the player's account default or the default instance for the avatar selected by the player. The manner in which a player is assigned to a game instance may vary significantly based on the nature of the game. For example, the game server 104 may be configured to match the player with a number of other players that is sufficient to hold a match. If the game supports two teams with six players on each team, the game server 104 may locate eleven other players before generating the instance. The technique used to match players up to enter an instance is not critical, but may be performed at random or by using the account database 106 to identify player skill information, such as rankings, levels, hit accuracy, win percentage, or other indicia of player skill that can be used to match the player against other players of relatively equal skill.

As another example, an already existing instance may have a player who disconnected or left the game, thus the game server 104 may place the player associated with the requesting game client into the already existing instance to maintain balance between the teams. As yet another example, the game server 104 may place the player into a newly generated instance which allows the player to experiment with different characters and weapons while the instance fills up with other players who are subsequently placed into the instance. Then, when the number of players is sufficient to hold a match, the players may be reset back to their initial positions and the objectives for the match may then be activated. Alternatively, players who are queued, but have not yet been placed into an instance for a match, may enter a special skirmish instance which allows them to experiment with characters and weapons with other players waiting in the queue, but are then transported to another instance hosting actual matches when a sufficient number of other suitable players are found.

After the game instance is generated, the game server 104 sends data back to the requesting game client that describes the game instance. In response, the requesting game client generates a user interface for the player that displays the environment and provides the player with the ability to control their playable character(s). For example, the game server 104 may send back data describing the geographic characteristics of the map, characteristics and equipment of the player, the location and type of each enemy, the location of the player, status of the player and non-player characters, objects, dialog, and so forth. The game clients then process that information into a user interface for the player. For example, the game clients may visually display the map within the vicinity of the player, render the player and non-player characters based on models correlating to the character and/or equipment types, display chat rooms or channels to communicate with other players or NPCs, render the various objects in the instance, and so forth.

In some embodiments, players may team up before requesting an instance, such as by adding friends on the friends list into a premade group. From that point a designated group leader (typically the person who initiated the invitations) can then request an instance for the entire pre-made group. Thus, instead of locating an instance for a single player, instead an instance is generated or discovered that can support the number of players found within the group. In some cases, the number of players in a pre-made group may be limited in number, such as being limited to the number of players that can fit within a single team. In addition, in such cases, the criteria used to locate other players of relatively equal skill may use the median or average of the group for the metrics used by the game server 104 to represent player skill.

6.0 Controlling a Game Instance

In some embodiments, the game server 104 periodically sends instance update messages to the connected game clients to keep the respective user interfaces updated with the current state of the instance. For example, depending on the rules of the game, the instance may be updated in real-time based on the actions of computer controlled enemies, environmental triggers, or the actions of the players participating in the instance. As a result, the game instance may change even without input being supplied by every participating player. In response to receiving the update messages from the game logic module 201 of the game server 104, the game clients process the update messages to update the user interface to display the current state of the instance. In other embodiments, the game server 104 sends the instance update messages based on one or more conditions instead of or in addition to a periodic timer. For example, in a turn-based game the game instance may not progress until each participating player has provided input, thus rendering the periodic updates unnecessary.

In order to control the playable characters, players manipulate the user interface provided by the game clients via one or more input mechanisms. For example, the user interface may be configured to receive input via widgets displayed in the interface, mouse input, keyboard input, gamepad input, joystick input, voice controls, or any other appropriate input mechanism. In response to receiving user input to control one or more characters, the game clients convert that input into one or more messages that are sent to the game logic module 201 of the game server 104. The game logic module 201 then manipulates the instance state 202 based on the rules provided by the game and the player input. In some embodiments, the user interfaces executing on the client computers attempt to predict the result of the player's actions by automatically updating the user interface to a state that approximates the impact of the action on the game instance. For example, if a game client receives input to jump a character forward, the game client may render that animation before receiving input from the server that the action was successful. Due to network delay between the game clients and the game server 104, such approximations may provide a smoother gameplay experience for the players. However, in such embodiments, the user interface of the game clients is still updated with the actual state of the instance upon being updated by the game server 104. Depending on the embodiment, the game clients may implement an appropriate smoothing or anti jitter rendering algorithm to minimize the effect of the correction.

7.0 Events

As discussed above, as a match of the game progresses events that take place during the match are added to an event log 203 by the game logic module 201. In some embodiments, the event log 203 represents events that are caused or driven by players over the course of the match, such as a player moving, using an ability, firing a shot, capturing an objective, interacting with an object, performing an emote, colliding with another player, entering a vehicle, and so forth. There are innumerable types of events that may be included in the event log 203 which are dependent on the specifics of the game being played. However, the techniques discussed herein are generalizable to virtually any game and the types of events may extend beyond the provided examples.

Figure 3:
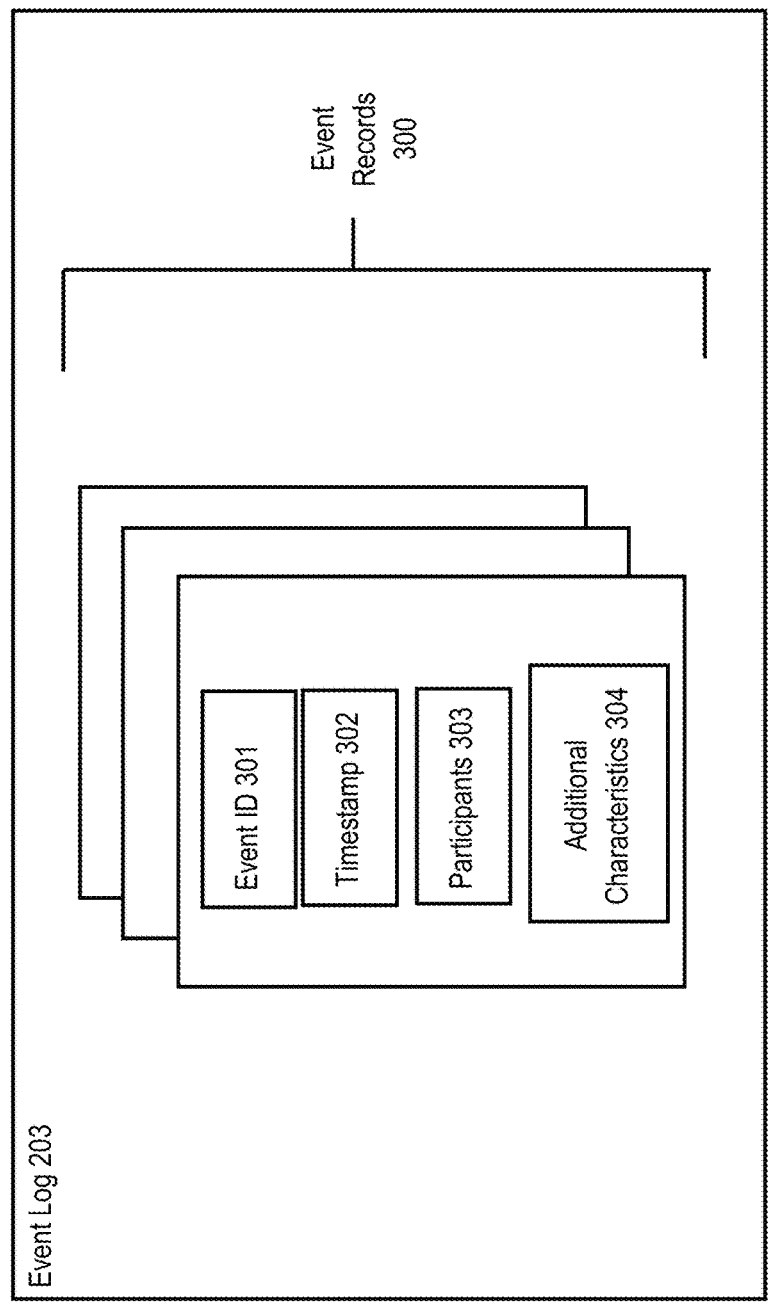
FIG. 3 illustrates an example format of an event log according to an embodiment.

FIG. 3 illustrates an example format for the event log 203 according to an embodiment. Other embodiments may use a format for the event log 203 that differs the one depicted in FIG. 3.

In FIG. 3, event log 203 includes a number of event records 300 that represent the events that took place over the course of a match. Although only one set of event records 300 is depicted in FIG. 3, in other embodiments the game server 104 hosts multiple instances concurrently and therefore the event log 203 may maintain a different set of event records 300 for each match being played on those instances or may store multiple event logs. Each of the event records 300 includes an event ID 301, a timestamp 302, a list of participants 303, and additional characteristics 304.

In an embodiment, the event ID 301 identifies the type of event that has occurred. For example, events may be broken down into types such as, a damaging event, a healing event, a buffing event, a defensive ability event, an objective capture event, an object interaction event, an environment interaction event, a mobility event (e.g. teleportation, sprinting, dashing, etc.), a hybrid event, and so forth. As discussed previously, play of the games may be divided into different categories depending on the characteristics of the play, such as saving a teammate, getting a large kill streak, making a difficult shot, shutting down an ability of an opponent, and so forth. The scoring criteria for each category may differ and some types of events may not be applicable to some categories. For example, an event where a player fires a large explosive shot, such as a rocket from a rocket launcher, or a close ranged attack, such as swinging a melee weapon, may be excluded when calculating scores for the sharpshooter category. Thus, the scoring module 205 may filter events by event ID 301 when determining a score for the event for each of the categories and instead assign the event a score of zero for categories to which that type of event does not pertain.

In an embodiment, the timestamp 302 represents the time within the match when the event represented by the record occurred. For example, the timestamp 302 may be given as a time offset from the start of the match, Coordinate Universal Time (UTC), time at the location of the game server 104 and/or the game clients, and so forth. In some cases, an event may have multiple timestamps. For example, if one player throws a weapon with a timer, such as a grenade, there may be one timestamp indicating when the player through the grenade, and another indicating when the grenade exploded and dealt damage to other players. As another example, an operator of a mechanical suit may set the suit to self-destruct and eject. There may be one timestamp indicating when the self-destruct activated and another when the explosion occurs.

In an embodiment, the participants 303 represent a list (or other data structure) that identifies the players involved in the event. In some embodiments, the player who caused the event is identified in the participants 303. For example, the first player in the list may be the player who caused the event, whereas the remaining players may be the players affected by the event. As another example, the player who caused the event may be marked with a value, such as a flag, that indicates the player caused the event.

In an embodiment, the additional characteristics 304 represent other characteristics of the event that may be tied to that type of event. For example, the event ID 301, timestamp 302, and participants 303 may be recorded for all events, whereas different additional characteristics 304 may be recorded for different event types. For example, an event representing a bullet fired sniper rifle may record whether the shot hit, the amount of damage done by the shot to various players, whether the shot one was "one shot one kill", the distance between the sniper and the target, whether one or more players involved were airborne and/or how high in the air each player was for the event, whether a teammate was saved from certain or almost certain death as a result of the shot, whether the shot stopped an action being performed by an enemy player, and so forth. However, such an event may not require a field indicating amount of healing done by the event if that event could not possibly heal a player (with possible exception of a sniper bullet that functions both to harm enemies and heal allies). Thus, the additional characteristics 304 may differ between types of events.

In some cases, one or more fields of the event records may not be capable of being completed at the time the event was first recorded. For example, in first person shooter games there are a couple categories of weapons, such as hit-scan weapons and projectile weapons. Hitscan weapons function by drawing a ray in the direction of the weapon as it was fired and registering the hit as though the bullet traveled instantaneously to its target. Thus, hitscan weapons have no travel time and the result of the event can be instantly calculated. Projectile weapons, by contrast, have a travel time and have behavior that is often dictated by the physics engine of the game. Since projectile weapons have a travel time the result of the event is dependent on the inputs supplied by other players while the projectile is in the air. As a result, the game server 104 may add an initial entry in the event log 203 when the projectile weapon is fired and then revisit to update the fields once the effect is ascertained. However, other embodiments may store records in a temporary storage location until the result is known and then add a complete record to the event log 203. Another case where there may be delayed recording of information in an event record is the case of events related to healing and buffing. For example, a player may heal or buff a teammate who then goes on to perform an impressive play that wracks up a large amount of damage and kills on the enemy team. However, at the time the player heals or buffs the teammate, the effectiveness of that heal or buff in terms of helping their teammate is not yet known. Therefore, kills or damage done by the buffed/healed teammate within a threshold period of time since the start of the event may be added back to the additional characteristics 304 for record representing the event. Alternatively, the scoring module 205 may be configured to look ahead into records of the events caused by the healed/buffed teammate and consider those when scoring the healing/buffing event, rather than actually incorporating that information into the record for the healing/buffing event.

8.0 General Process Flow

Figure 4:
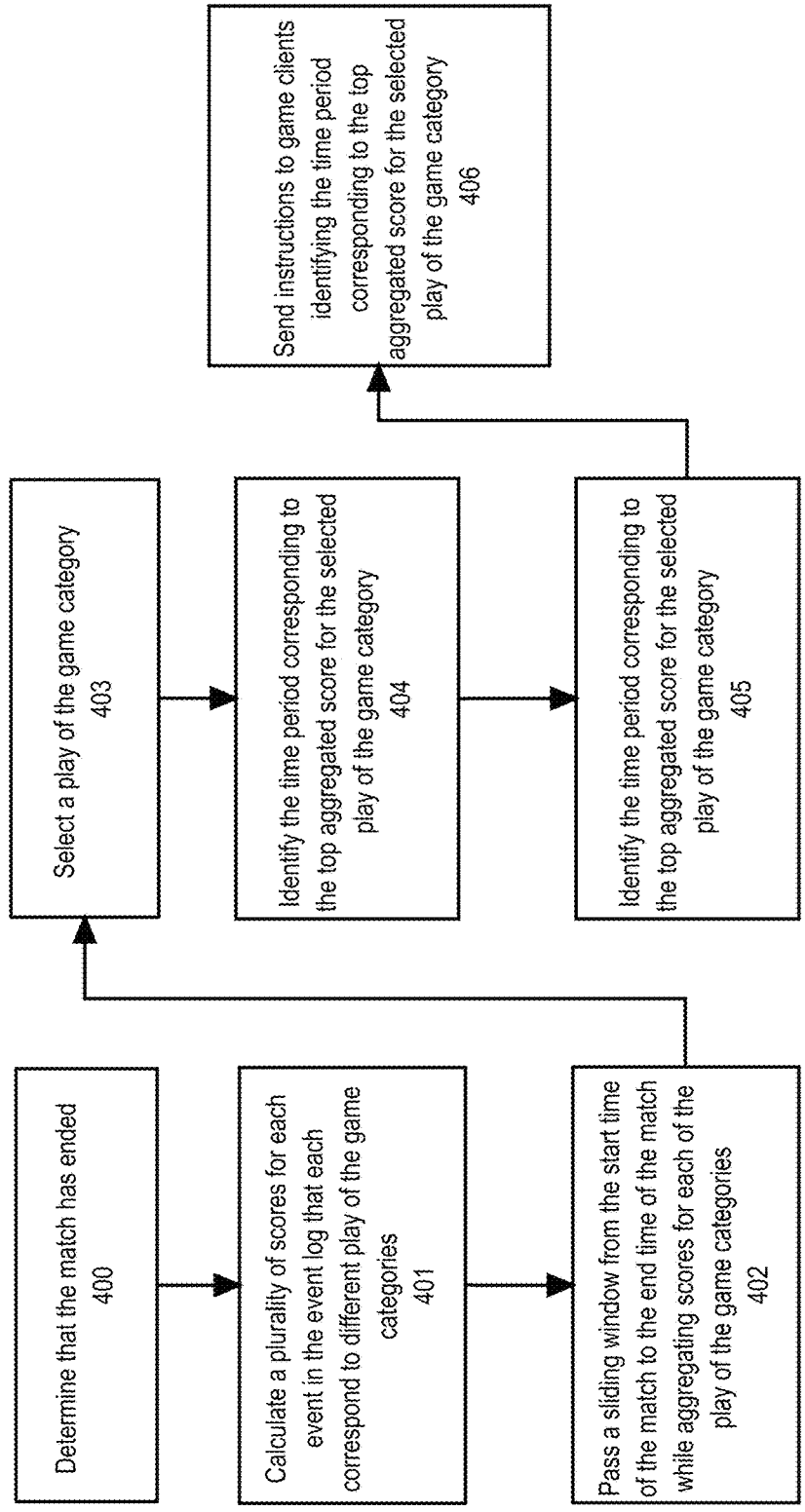
FIG. 4 illustrates a process flow for identifying a play of the game in block diagram form according to an embodiment.

FIG. 4 illustrates a process for determining and displaying a play of the game according to an embodiment. The process flow depicted in FIG. 4 may be implemented using software, hardware, or a combination of software or hardware. For the purpose of illustrating clear examples, FIG. 4 is assumed to be performed by the components of the game server 104 illustrated in FIG. 2. Although FIG. 4 illustrates a specific set of steps, other embodiments may reorder steps, combine steps, divide steps out into multiple sub-steps, or remove steps compared to the process depicted in FIG. 4.

At block 400, the game logic module 201 determines that a match of the game has ended. In an embodiment, the game logic module 201 processes input from the game clients, updates the instance state 202 and event log 203, and then replies to the game clients to update their own displayed state. While monitoring the game, the game logic module 201 includes logic that represents rules and conditions indicating when a match of the game has ended. For example, the conditions ending the game may be when a timer runs out, when an enemy team has been wiped out, when certain objectives are captured, when a certain number of kills have been reached, when a team votes to concede, and so forth. When the game logic module 201 has determined that the match has ended, the game logic module 201 invokes the play of the game module 204 to generate a play of the game. In an embodiment, the play of the game module 204, after being invoked, calls the scoring module 205 to score the events in the event log 203.

8.1 Scoring Events

At block 401, the scoring module 205 calculates a plurality of scores for each event in the event log that each correspond to different play of the game category. In an embodiment, the play of the game module 204 is configured to produce play of the games that correspond to a variety of different categories, each with a separate set of criteria used to score events. For example, some categories may focus on plays involving large kill streaks, others may focus on plays where a player saved a teammate, and yet still others may focus on plays where a difficult shot was made. There is no limit to the categories of play of the game that an embodiment may choose to implement or the criteria used to score events for each category. A general description of how to perform the scoring is provided below followed by subsections describing the criteria for a few example play of the game categories.

In an embodiment, the scoring module 205 iterates through the event listed in the event log 203. At each iteration the scoring module 205 applies the criteria for each of the categories and, for each category, assigns the event a score. In some embodiments the higher the score, the more impressive the play. However, other embodiments may use a scoring system where the most impressive play has the lowest score. The criteria may be confined within the fields of the record itself or may be dependent upon other records in the event log 203. For example, as described earlier, determining the score for a healing or buffing event may be dependent on records of the healed/buffed player(s) that fall within a threshold period of time from when the healing or buffing event occurred. When the last event has been scored, the scoring process completes and the scoring module 205 invokes the play identification module 206 to determine the play of the game.

8.1.1 High Score

The "high score" category focuses on plays which are impressive due to the number of kills achieved in quick succession. Thus, the score for the "high score" category may be based on the number of kills caused by the event. For example, the score may be linear in relation to the number of kills caused by the event, such as assigning a base score of X, then multiplying that base score by the number of kills. As another example, the score may be non-linear in relation to the number of kills caused by the event, such as exponentially increasing the score based on the number of kills. In some embodiments, the total damage done may factor into the "high score" category, even if that damage did not result in a death. For example, the score for an event may be a weighted combination of kills and damage done.

In some embodiments, certain abilities by specific heroes or character classes may be designed to cause a large number of deaths. As a result, continuously viewing "high score" play of the games as a result of these types of abilities may become repetitive and boring for the players. Thus, there may be certain abilities, such as those marked with a specific Event ID 301 or a set of Event IDs which receive a lower weighted score than others. For example, some games have characters which utilize an "ultimate" ability. These abilities tend not to be available all the time, but instead require a secondary resource. These secondary resources may be built up by dealing damage, taking damage, healing, capturing objectives, surviving a period of time, or generated based on any arbitrary criteria. Ultimate abilities are intended to be powerful and used strategically and sparingly. However, since these abilities often involve jumping into an enemy team and pushing the button to activate the ultimate, these do not always represent an especially skillful play. Thus, the scoring module 205 may decrease the score for events representing ultimate abilities (or a subset of ultimate abilities) by a set amount or percentage to lower their impact when selecting the play of the game. However, other embodiments may be configured to showcase plays where ultimate abilities are used, and therefore may not scale the score for those events lower than other abilities or may even weigh them higher than other events.

8.1.2 Life Saver

The "life saver" category focuses on plays which are impressive due to saving a teammate for nearly certain death. Thus, the "life saver" category is focused on situations in which a teammate would have died but for the actions of the player. In some embodiments, the "life saver" category may take into consideration factors such as, healing done to a teammate, shields/armor given to a teammate, whether an ability was interrupted that would have resulted in the death of a teammate, and so forth. For example, in the case of a healing or shielding event, the scoring module 205 may look into the event log 203 for events which caused damage to the healed/shielded teammate to determine if their health would have been reduced to zero without the intervention of the player. The score may be scaled based on amount of healing/shielding provided, how much damage the player took afterward, the damage or kills the teammate achieved for a set period of time after receiving the heal/shield, and so forth.

However, in some cases, determining whether a player has been saved could be difficult to determine, especially if there are multiple events healing or shielding the teammate from multiple players. Thus, in some cases, the lifesaver category looks for events which interrupted an ability that is already affecting a teammate and would likely have caused that teammate's death. For example, assume a character has the ability to charge into an enemy and carry them forward until crashing into a wall which results in enough damage to kill all or most characters in the game. If the charge caught a teammate and another teammate used an ability to interrupt the charge, such as using their weapon to freeze the enemy mid-charge, this is the type of "a-mei-zing play" that could be given a strong score in the "life saver" category. As discussed above, the score may be weighted based on the performance of the saved player after the event.

8.1.3 Sharpshooter

The "sharpshooter" category focuses on plays which are impressive due to being a shot that is difficult to perform. In some embodiments, factors considered for scoring the "sharpshooter" category include how far away the target was from the initial shot, whether the player making the shot and/or the player shot is in mid-air, the relative elevations of the player and the enemy, whether there were nearby objects that could have blocked the shot if off by a relatively small margin, whether a critical area of the enemy was hit (e.g. headshots), time between the opponent coming into line of site and the shot being made, speed of the enemy being shot, and so forth. In some embodiments, certain characters or types of events may be weighted less than others in the "sharpshooter" category for some factors. For example, a sniper character generally has an extremely long range and therefore the distance factor may be weighed less heavily when determining the sharpshooter score for a sniper shot. In addition, certain factors may be weighted higher than others due to drastically increasing the difficulty of the shots, such as shots where the player, the enemy, or both are airborne. Furthermore, some characters may have abilities that let them float in the air and "rain justice from above" for relatively long periods of time and those characters may receive a lesser score from the factor related to being airborne.

8.1.4 Shutdown

The "shutdown" category focuses on plays which prevent enemies from activating an especially powerful ability or effect. As discussed above, many types of games include "ultimate" abilities which are available infrequently, but can have devastating effects on the battlefield. In some cases, these abilities are so strong that in order to allow for skillful gameplay, there is a window that allows such abilities to be countered. For example, assume the ultimate ability of a character causes that character to fly into the air and unleash a barrage of rockets at unsuspecting foes below. To temper the strength of this ability, the game designers may cause the character to have an audio or visual cue that indicates the ability is about to activate. This cue provides a short period of time in which the other team can try to kill or disable the character using the ultimate ability. A player that manages to successfully counter the ultimate ability of another character is considered to have "shut down" the ultimate to the benefit of their team. Events caused by a player that interrupt another player's ultimate ability gains score in the "shutdown" category. Although the "shutdown" category is described in reference to shutting down "ultimate abilities" the concept may apply to any ability that is sufficiently powerful, even if it does not meet the definition of an "ultimate ability".

The factors considered in determining the score for the shutdown category may be the type of ability shut down (some abilities when shut down may grant more score than others), whether teammates were in the vicinity of the shutdown ability and likely would have been adversely affected, the time between the ultimate ability is activated and when the ultimate was shut down, whether the shutdown included killing the enemy using the ultimate ability, and so forth. For example, in some cases ultimate abilities are channeled and have effects which can be stopped at any time during the case. For instance, a character may spin around shooting enemies in an area of effect around them to clear the area for a short time, which will continue to deal damage until interrupted or until the time expires. Thus, the sooner the player shuts down the ultimate the greater the benefit to the player's team.

8.2 Identifying the Play of the Game

At block 402, the play identification module 206 passes a sliding window over the event log 203 from the start time of the match to the end time of the match while aggregating scores for each of the play of the game categories.

In an embodiment, the sliding window is sized to be the same length of time for which the display of the play of the game will run. For example, if the goal is to display a play of the game that is 2 minutes long, the length of the window may be set to 2 minutes. However, other embodiments may use a variable length window. For example, multiple windows of shorter or longer lengths may be used for each category.

In an embodiment, the play identification module 206 passes the sliding window over the event log 203 in one or more increments. At each increment, the sliding window is moved forward a set amount. The set amount for each increment may be set to any arbitrary value of time. However, in some embodiments, the set amount is configured to be fine enough to capture all permutations of events which may fit within the sliding window. However, other embodiments may use a coarser value for the set amount to reduce the number of calculations required to perform the score aggregations.

In an embodiment, at each increment of the sliding window, the play identification module 206 identifies the events in the event log 203 that fall within the sliding window. Then, for each play of the game category, the identified events are aggregated and associated with the play of the game category and the current increment (or the beginning and ending time of the window at the current increment). In some embodiments, the aggregation is the addition of the scores of each of the identified events for the category currently being processed. However, in other embodiments, the aggregation may be weighted, such as weighting some events higher than others. In some embodiments, the aggregation is also performed over the events caused by each player. For example, this technique may be useful for cases where the play of the game is to be displayed from a perspective of a particular player and the goal is to find the player who made the most impressive play. In this case, the aggregation would be performed on a per-category and per-player basis. Thus, each aggregated score would be associated with the current increment, the play of the game category, and the player whose events were aggregated over. Similarly, the aggregation may instead be performed on a per-team basis. Thus, this case would locate the play of the game that was most impressive for one of the teams competing in the match.

Figure 5A:
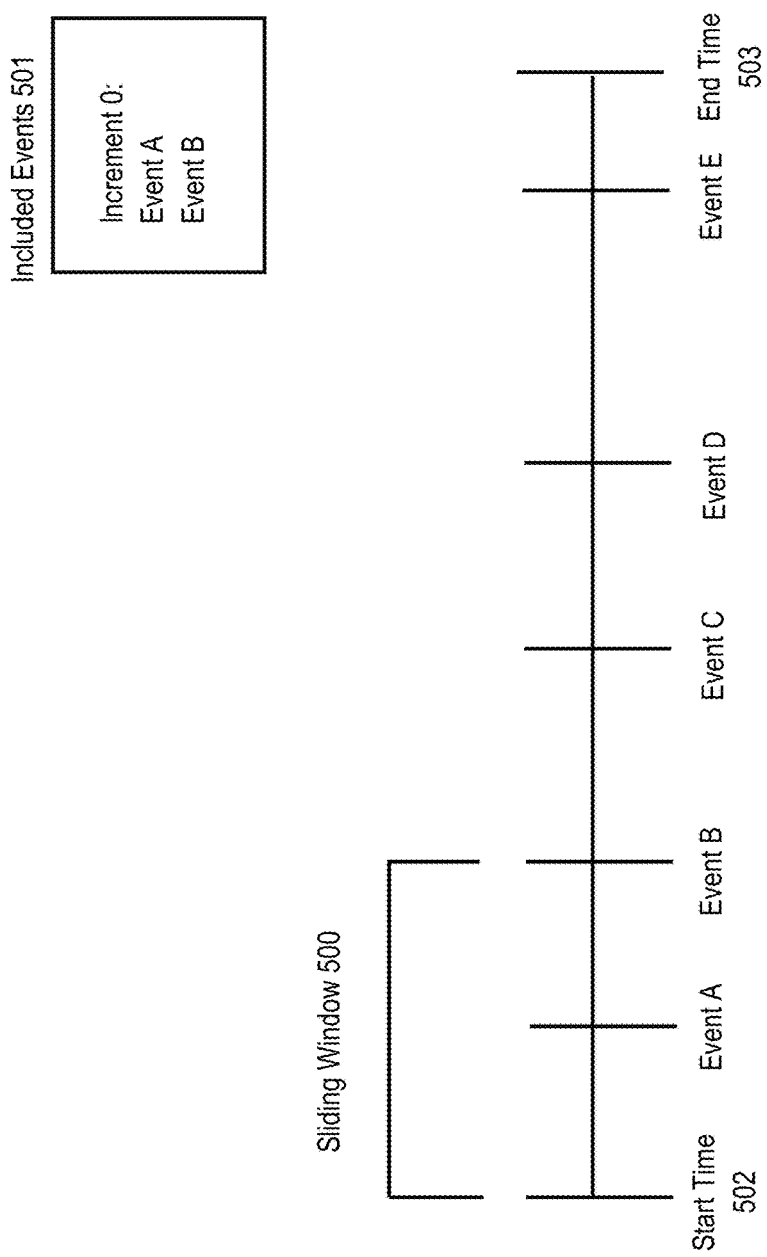
FIG. 5A illustrates a first view of a sliding window being passed over events according to an embodiment.
Figure 5B:
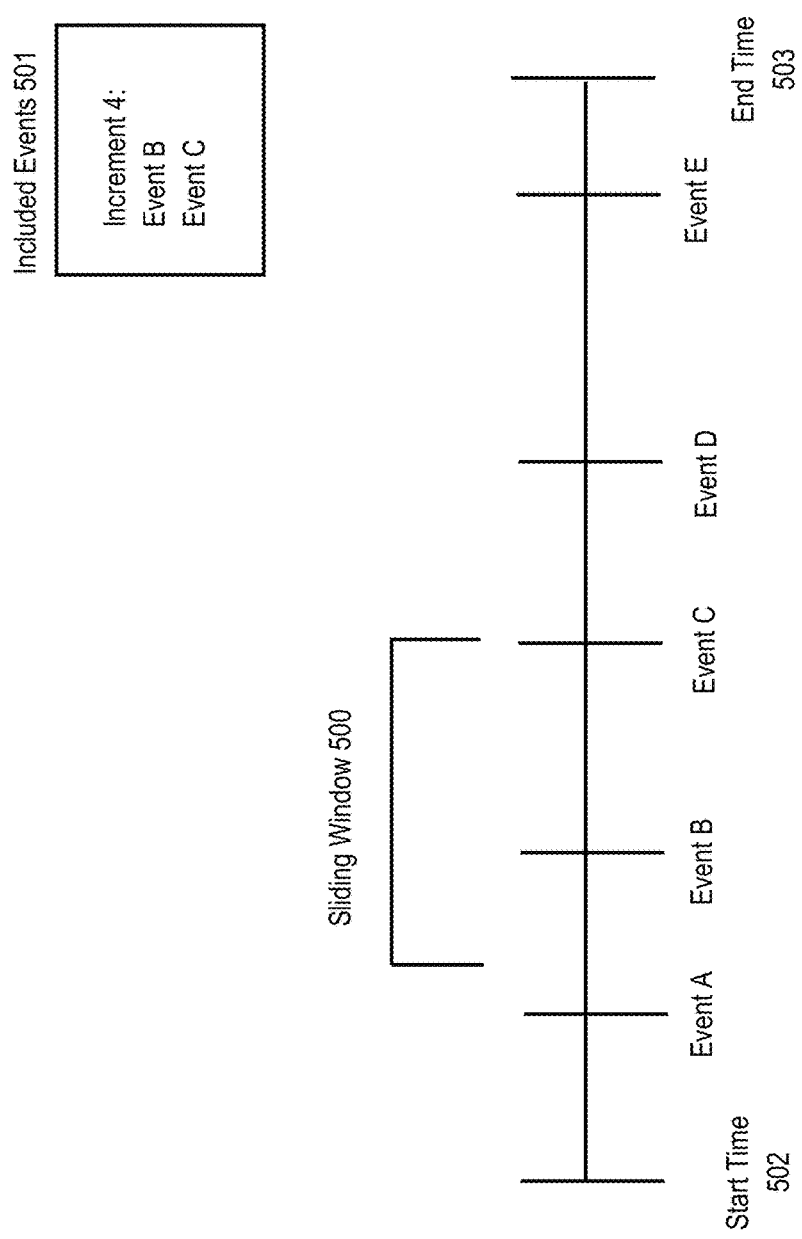
FIG. 5B illustrates a second view of a sliding window being passed over events according to an embodiment.
Figure 5C:
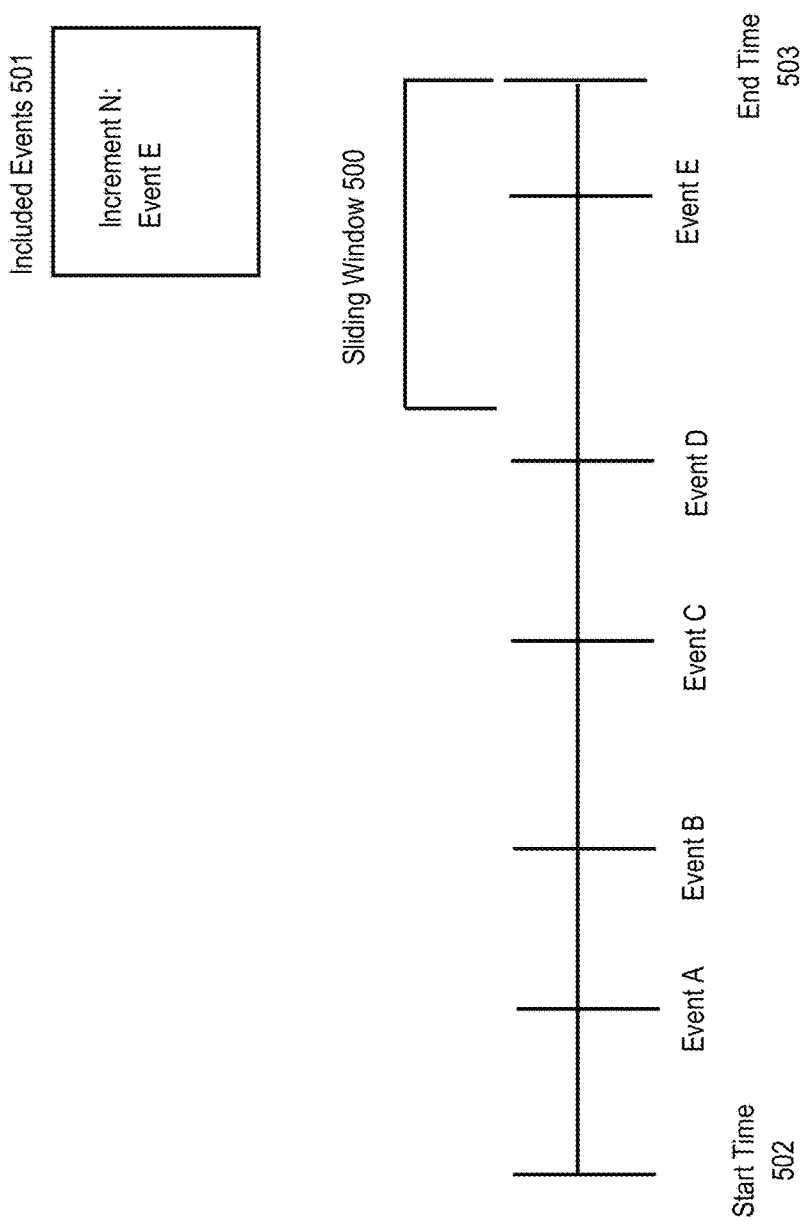
FIG. 5C illustrates a third view of a sliding window being passed over events according to an embodiment.

FIGS. 5A, 5B, and 5C depict an example sliding window 500 being passed over a series of events from a start time 502 of a match and end time 503 of a match. Although only a specific number of events are depicted (Event A, Event B, Event C, Event D, and Event E), the techniques described herein are applicable to an event log 203 that includes any arbitrary number of events.

In FIG. 5A, the sliding window 500 is at increment 0 and thus the beginning of the sliding window 500 is at the start time 502 and extends a set amount of time across the timeline. In this case, the sliding window 500 has included events 501 which encompass both Event A and Event B. Thus, the scores for each category for Event A and Event B are aggregated and associated with their associated categories and increment 0.

In FIG. 5B, the sliding window 500 is at increment 4 and thus the beginning of the sliding window 500 is 4× the increment value and extends a set amount across the timeline by the length of the sliding window 500. In this case, the sliding window 500 has included events 501 which encompass both Event B and Event C. Thus, the scores for each category for Event B and Event C are aggregated and associated with their associated categories and increment 4.

In FIG. 5C, the sliding window 500 is at increment N (representing the last increment) and thus the beginning of the sliding window 500 starts at a window length behind the end time 503 and extends to the end time 503. In this case, the sliding window 500 has included events 501 which encompass only Event E. Thus, the scores for each category for Event E are aggregated and associated with their associated categories and increment N. In this case, since there is only one event, that aggregation may be the same as the score for Event E for each of the categories.

At block 403, the play identification module 206 selects a play of the game category. In an embodiment, the play identification module 206 selects a category by identifying the top accumulated score for each category across the increments and selecting the category corresponding to the greatest of the top scores. However, in other embodiments, some categories may generally produce more exciting play of the games than others. For example, the "high score" category may generally be exciting if the kill streak is high, but if the kill streak is low plays in this category may be considered underwhelming. Thus, some embodiments may set a threshold value for the "high score" category where the other categories are only considered if the highest aggregated score in the "high score" category fails to clear the threshold. The remaining categories may be decided between by the greatest of the remaining highest aggregated scores.

At block 404, the play identification module 206 identifies the time period corresponding to the top aggregated score for the selected play of the game category. In an embodiment, the play identification module 206 identifies the time period corresponding to the top aggregated score based on the increment associated with highest aggregated score for the selected play of the game category. For example, the increment may be multiplied by the set amount the sliding window 500 was moved forward at each increment to set the start time. In addition, the end time can be identified by moving the start time forward by the length of the sliding window 500.

8.3 Displaying the Play of the Game

At block 406, the communications module 200 sends one or more instructions to the game clients identifying the time period corresponding to the top aggregated score for the selected play of the game category. For example, the game clients, similar to the game server 104 may also maintain their own respective event logs which allow the events of a match to be replayed for the user. Thus, in response to receiving the instructions which identify the time period corresponding top aggregated score for the selected play of the game category, the game clients may recreate the state at the start time of the identified time period and play the recorded events forward until reaching the end time for the time period. In some embodiments, if the events were caused by a particular player, the events may be displayed using a camera that shows the perspective of that player. However, in other cases, the game clients may display the play of the game using third-person cameras, a first-person camera that switches perspectives, or combinations thereof.

In other embodiments, the game server 104 sends the events of the event log 203 that occurred during that time period to the game clients. The game clients then process the events to replay the events that occurred during the time period to display the play of the game. For example, the game server 104 may generate a replay reel identifying a start time and a duration of the reel. The replay reel contains all the network events sent from the server to the game clients for the requested duration as well as a preferred player to watch. Once the game server 104 has generated the replay reel, the game server 104 can transfer the replay reel down to the game clients involved in the match, which then causes the game clients to display the reel back to the players, simulating the play with the camera using the perspective of the preferred player. In some embodiments, the events represented in the replay reel contain information identifying the position of the characters at each "tick" or interval of time so that the game clients can simulate their movements during replay. However, in other embodiments, the events represented in the replay reel may contain the direction and length of movement of characters and/or objects at each time interval with the replay reel providing an initial state of the game world that is subsequently modified by the events during the replay. In still other embodiments, the game server 104 may render the events of the play of the game into a video which is then uploaded or streamed to the game clients.

9.0 Combination Plays of the Game

In some embodiments, in addition to plays which involve a particular player or team, combination plays which involve different permutations of players are also considered for the play of the game. For example, one character may be capable of setting up a teleporter that their teammates can use to move swiftly cross large distances and get back into the fight in a much shorter period of time. Another player who uses the teleporter may wrack up a large kill streak, but the play was not entirely on the part of only the player who actually obtains the kills. In some embodiments, at block 402, the play identification module 206 aggregates over different permutations of players which are on the same team and aggregates the scores for events for any of the players in the permutation for each of the categories. As a result, the game server 104 can generate plays of the game which consider the contribution from a subset of players on the team.

In some embodiments, the play of the game displayed for combination play swaps between first-person perspectives of the participating players. Continuing from the example above, the camera may first focus on the player setting down the teleporter and then swap the perspective to the player who uses the teleporter and obtains the kill streak. For example, the time for the play of the game may be proportioned between their perspectives based on the number or score of the events attributed to each player within different windows of time for the play. Other embodiments may use third person perspectives that encompass any number of the participating players. For example, the camera may be situated to view the area where the majority of the events took place or where the highest scoring events took place within the play. Still other embodiments may use a split-screen that is divided to show the first-person perspective of each player involved simultaneously.

10.0 Unlockables

In some embodiments, participating in matches grants points (or other form of virtual currency) to the players who participate in the match. For example, there may be a base number of points awarded for participating, with additional points being awarded for being on the winning team, getting the play of the game, getting kills, dealing damage, healing, supporting the team, and so forth. The points granted to players may then be spent on an in-game store that unlocks cosmetic items such as alternative skins for characters, new weapon looks, "sprays" which can be used to mark walls and other objects with a graphic, new voice lines that can be activated in game to make the character say various phrases, new emotes for players, and so forth. The rewards unlocked by points are referred to as "unlockables".

In some embodiments, the unlockables include intro reels that are played by the respective game clients before the play of the game is displayed. For example, the introduction reel may display the character played by the player who obtained the play of the game in various poses or performing various actions (e.g. a character may start with their back facing the character and spin around showing a menacing look). Thus, players may unlock various intro reels that are then used to showcase their character when they obtain the play of the game. In cases where there are multiple characters, the unlockables may include poses or animations for the character of that player that can be shown concurrently with the poses or animations of characters belonging to the other players who participated in the play of the game. In some embodiments, the intro reel displays the name of the player(s) who earned the play of the game and/or displays the category of play of the game that was achieved. In some embodiments, the unlockables include filters that can be placed on the play of the game display, such as one that shades the display of the play of the game to look like a noir film. In still other cases, the unlockables include special effects that can be added to the display of the play of the game, such as fireworks, slow-motion effects, blur effects, highlighting, and so forth.

11.0 Play of the Game Storage

In some embodiments, the game server 104 after sending the instructions at block 406 clears the event log 203 to save space. However, in other embodiments, the game server 104 may instead archive the event log 203 in the game world database 105. For example, the developers of the game may set up a web server that pulls event logs from the game world database 105, determines the top scoring plays of the game for each category, and then publishes the top N play of the games for each category every week for users to view. In other embodiments, rather than storing the event log 203, the game server 104 may render the play into a video file that is then stored in the game world database 105. In some embodiments, the game clients have the capability to send requests to the game server 104 for plays matching particular criteria (players involved, category, score of the play, date, etc.) and the game server 104 then query the game server 104 for plays matching those categories. The game server then responds to the game clients with metadata related to the matching plays, such as the players involved, category, date, score, thumbnail image of a scene in the play, and so forth. The game clients display the metadata to the player and receives a selection of one of the plays of the game, which then causes a message to be sent to the game server 104 requesting that play. The game server 104 then, depending on the embodiment, sends the requesting game client the events which allow the play to be simulated by the game client or a video of the play.

In addition, in some embodiments, the game clients may also store the play of the games into non-volatile storage for later viewing by the player. Depending on the embodiment, the play of the game may be stored by storing the events or by storing a rendered video of the events.

12.0 Personal Play of the Game

In some embodiments, the game server 104, in addition to causing the game clients to display the play of the game, also send each game client instructions which identify the best play of the play of the game for the player associated the game client. For example, during block 402 the game server 104 may aggregate scores for each category and for each individual player participating in the match. Then, at block 403, block 404, and block 405 the game server 104 may additionally select the category in which each player best performed, identify the time interval for each player that corresponds to their best play within that category, and then send instructions identifying the category and time interval to the corresponding game client. The game clients may be configured to display the personal play of the game in addition to or instead of the overall play of the game for the match. Alternatively, the game clients may be configured to temporarily or permanently store the play of the game in a local database for the player to later browse and view.

13.0 Social Media Sharing

In some embodiments, the game server 104 and/or the game clients are configured to communicate with a social media service and send the play of the games for publication. For example, game client 100 may be configured to process the events into a video file supported by a social media service (such as Facebook), which then posts the video for other users of the service to view. In some embodiments, the game clients have the option to display a menu related to social media viewing (such as through a button or link displayed while running the game clients) that when selected displays a collection of play of the games in which the player participated. Upon selecting a play of the game from the collection, the game client interfaces with the social media service (e.g. through one or more API calls) and uploads a video of the selected play of the game. In alternative embodiments, the game clients instead of interfacing directly with the social media service uses the game server 104 as an intermediary. For example, the game clients may request and receive a list of their plays from the game server 104, allow for the selection of a play to share, and then send a message to the game server 104 identifying the selected play. The game server 104 then interfaces with the social media service to allow the play to be published.

14.0 Extensions and Alternatives

Although the embodiments discussed above include primarily examples from first person shooter games, the techniques are not limited to first person shooter games. For example, the same process depicted in FIG. 4 may also be used for massive multiplayer role playing games (MMORPGs), multiplayer online battle arenas (RPGs), real-time strategy games (RTSs), turn-based strategy games, virtual collectible card games, action role playing games (ARPGs), and many others. Furthermore, the techniques discussed herein are not limited to computer games, but also may be extended to real-world sports games such as baseball, basketball, soccer, hockey, and so forth. For example, an automated system may be established to review footage of a sporting event and identify events using feature recognition techniques. Once the events are identified, the process illustrated in FIG. 4 above can then be utilized to determine the play of the game for those events.

14.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
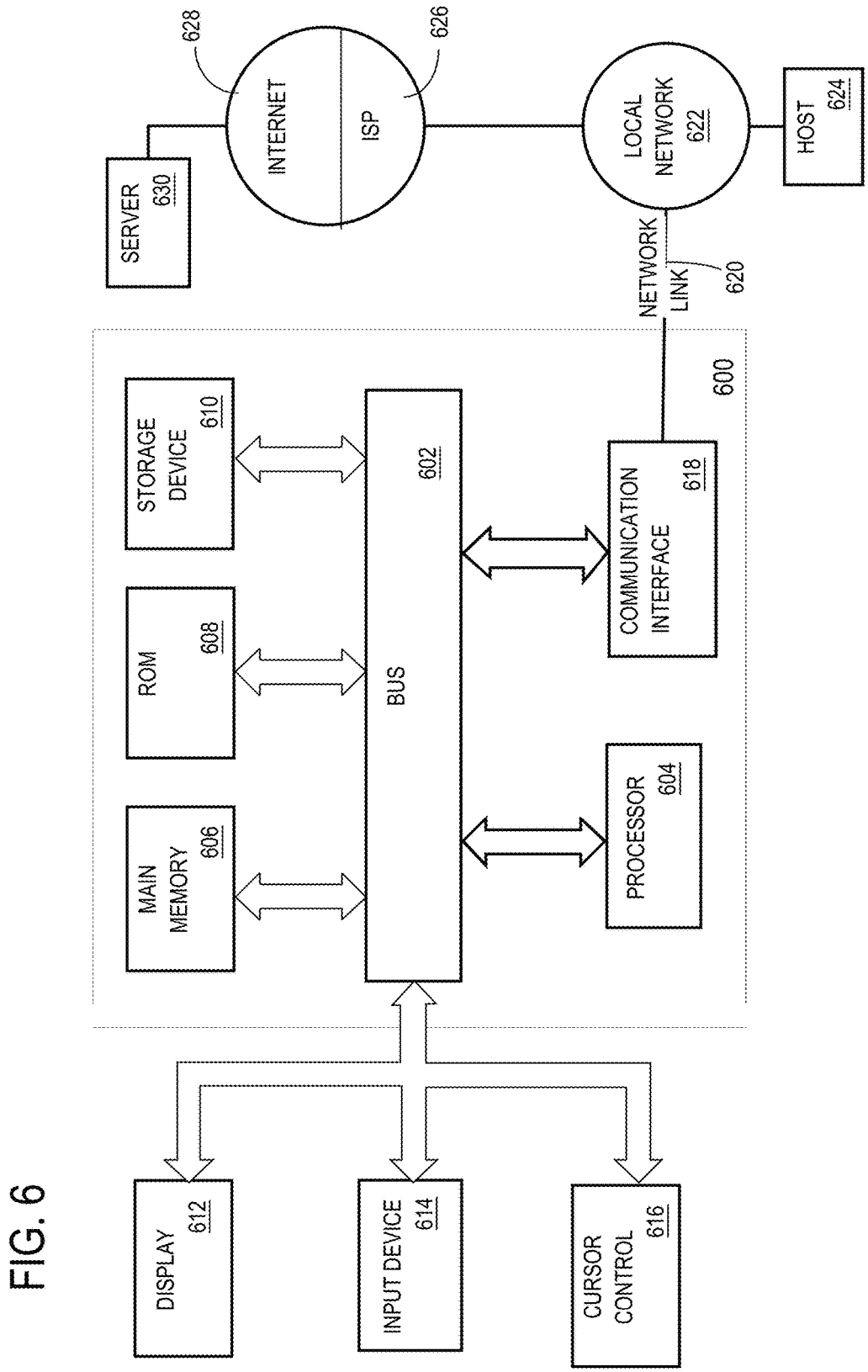
FIG. 6 illustrates an example computer system for performing various machine-implemented steps described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

receiving data representing a plurality of events that took place during a match of a game, wherein each event of the plurality of events is tagged with a respective timestamp representing when that event took place during the match, wherein the match includes a start time and an end time;

for each event of the plurality of events, generating a plurality of scores for the event, wherein each score of the plurality of scores is related to a respective play category of a plurality of play categories and is generated using a respective set of criteria associated with the respective play category;

wherein the plurality of events includes a particular event wherein the plurality of play categories includes a first play category and a second play category that is different from the first play category;

wherein generating the plurality of scores for the particular event includes:

generating a first score associated with the first play category for the particular event using a first set of criteria associated with the first play category, and generating a second score associated with the second play category for the particular event using a second set of criteria associated with the second play category;

wherein the first set of criteria is different from the second set of criteria and the first score is different than the second score;

selecting, as a play of the game, a video clip of the match based on scores generated for events that occur in a time window covered by the video clip;

providing a mechanism by which the video clip selected as the play of the game may be played after the end time of the match;

wherein the method is performed by one or more computing devices.

2. The method of claim 1 wherein selecting the video clip comprises:

selecting a particular play category from the plurality of play categories based on a top aggregated score for each play category of the plurality of play categories; and selecting the video clip of the match based on a time increment associated with the top aggregated score for the particular play category.

3. The method of claim 2 further comprising:

passing a sliding window from the start time of the match to the end time of the match in one or more time increments, and for each time increment of the one or more time increments:

identifying one or more events of the plurality of events where the respective timestamp falls within the sliding window, and for each play category of the plurality of play categories, aggregating the score associated with the play category for each event of the one or more events into one or more aggregated scores associated with the play category and the time increment;

determining, for each play category of the plurality of play categories, a top aggregated score from the one or more aggregated scores for the play category across the one or more time increments.

4. The method of claim 1, wherein the plurality of play categories includes a play category whose respective set of criteria bases a score for an event based on one or more of:

healing caused by the event, damage caused by the event, whether one or more characters involved with the event is airborne, whether a player is saved from death by the event, or whether an enemy team was prevented from capturing an objective by the event.

5. The method of claim 2, wherein selecting the particular play category from the plurality of play categories is performed by:

determining that the top aggregated score for a first play category of the plurality of play categories is below a threshold score;

in response to determining that the top aggregated score for the first play category of the plurality of play categories is below the threshold score, selecting a second play category of the plurality of play categories that has a highest top aggregated score among a remaining set of play categories of the plurality of play categories.

6. The method of claim 3, wherein:

each event of the plurality of events is tagged with a particular player who caused the event of a plurality of players that participated in the match, for each time increment of the one or more time increments and each play category of the plurality of play categories, the one or more aggregated scores associated with the play category and the time increment correspond to the plurality of players and each aggregated score of the one or more aggregated scores associated with the play category and the time increment are based on one or more particular events of the one or more events where the respective timestamp falls within the sliding window that were caused by a respective player of the plurality of players, and the video clip is produced from a perspective of a player of the plurality of players that caused the one or more particular events used to aggregate the top aggregated score of the particular play category.

7. The method of claim 3, wherein:

each event of the plurality of events is tagged with a particular player who caused the event of a plurality of players that participated in the match, for each time increment of the one or more time increments and each play category of the plurality of play categories, each aggregated score of the one or more aggregated scores associated with the play category and the time increment are based on one or more particular events of the one or more events where the respective timestamp falls within the sliding window that were caused by at least one of two or more respective players of the plurality of players, and the video clip is produced from a combination of at least a perspective of a first player of the two or more respective players that caused a first portion of the one or more particular events used to aggregate the top aggregated score of the particular play category and a second player of the two or more respective players that caused a second portion of the one or more particular events used to aggregate the top aggregated score of the particular play category.

8. The method of claim 1, further comprising prior to displaying the video clip, modifying the video clip to add one or more special effects including one or more of:

highlighting one or more objects, players, or objectives, speeding up or slowing down a rate at which the video clip is played, applying one or more filters to the video clip, inserting an intro reel to the video clip, or adding one or more textual or graphical overlays to the video clip.

9. The method of claim 1, wherein the game is a video game and the video clip is displayed using a game client that is also used to play the video game.

10. The method of claim 1, wherein the video clip uses a third person perspective positioned to view an area where a portion of events of the play of the game took place.

11. A non-transitory computer-readable storage medium storing one or more instructions which, when executed on one or more processors, cause the one or more processors to perform steps comprising:

receiving data representing a plurality of events that took place during a match of a game, wherein each event of the plurality of events is tagged with a respective timestamp representing when that event took place during the match, wherein the match includes a start time and an end time;

for each event of the plurality of events, generating a plurality of scores for the event, wherein each score of the plurality of scores is related to a respective play category of a plurality of play categories and is generated using a respective set of criteria associated with the respective play category;

wherein the plurality of events includes a particular event wherein the plurality of play categories includes a first play category and a second play category that is different from the first play category;

wherein generating the plurality of scores for the particular event includes:

generating a first score associated with the first play category for the particular event using a first set of criteria associated with the first play category, and generating a second score associated with the second play category for the particular event using a second set of criteria associated with the second play category;

wherein the first set of criteria is different from the second set of criteria and the first score is different than the second score;

selecting, as a play of the game, a video clip of the match based on scores generated for events that occur in a time window covered by the video clip;

providing a mechanism by which the video clip selected as the play of the game may be played after the end time of the match.

12. The non-transitory computer-readable storage medium of claim 11, wherein selecting the video clip comprises:

selecting a particular play category from the plurality of play categories based on a top aggregated score for each play category of the plurality of play categories; and selecting the video clip of the match based on a time increment associated with the top aggregated score for the particular play category.

13. The non-transitory computer-readable storage medium of claim 12, wherein the steps further comprise:

passing a sliding window from the start time of the match to the end time of the match in one or more time increments, and for each time increment of the one or more time increments:

identifying one or more events of the plurality of events where the respective timestamp falls within the sliding window, and for each play category of the plurality of play categories, aggregating the score associated with the play category for each event of the one or more events into one or more aggregated scores associated with the play category and the time increment;

determining, for each play category of the plurality of play categories, a top aggregated score from the one or more aggregated scores for the play category across the one or more time increments.

14. The non-transitory computer-readable storage medium of claim 11, wherein the plurality of play categories includes a play category whose respective set of criteria bases score for an event based on one or more of:

healing caused by the event, damage caused by the event, whether one or more characters involved with the event is airborne, whether a player is saved from death by the event, or whether an enemy team was prevented from capturing an objective by the event.

15. The non-transitory computer-readable storage medium of claim 12, wherein selecting the particular play category from the plurality of play categories is performed by:

determining that the top aggregated score for a first play category of the plurality of play categories is below a threshold score;

in response to determining that the top aggregated score for the first play category of the plurality of play categories is below the threshold score, selecting a second play category of the plurality of play categories that has a highest top aggregated score among a remaining set of play categories of the plurality of play categories.

16. The non-transitory computer-readable storage medium of claim 13, wherein:

each event of the plurality of events is tagged with a particular player who caused the event of a plurality of players that participated in the match, for each time increment of the one or more time increments and each play category of the plurality of play categories, the one or more aggregated scores associated with the play category and the time increment correspond to the plurality of players and each aggregated score of the one or more aggregated scores associated with the play category and the time increment are based on one or more particular events of the one or more events where the respective timestamp falls within the sliding window that were caused by a respective player of the plurality of players, and the video clip is produced from a perspective of a player of the plurality of players that caused the one or more particular events used to aggregate the top aggregated score of the particular play category.

17. The non-transitory computer-readable storage medium of claim 13, wherein:

each event of the plurality of events is tagged with a particular player who caused the event of a plurality of players that participated in the match, for each time increment of the one or more time increments and each play category of the plurality of play categories, each aggregated score of the one or more aggregated scores associated with the play category and the time increment are based on one or more particular events of the one or more events where the respective timestamp falls within the sliding window that were caused by at least one of two or more respective players of the plurality of players, and the video clip is produced from a combination of at least a perspective of a first player of the two or more respective players that caused a first portion of the one or more particular events used to aggregate the top aggregated score of the particular play category and a second player of the two or more respective players that caused a second portion of the one or more particular events used to aggregate the top aggregated score of the particular play category.

18. The non-transitory computer-readable storage medium of claim 11, wherein the steps further comprise: prior to displaying the video clip, modifying the video clip to add one or more special effects including one or more of: highlighting one or more objects, players, or objectives, speeding up or slowing down a rate at which the video clip is played, applying one or more filters to the video clip, inserting an intro reel to the video clip, or adding one or more textual or graphical overlays to the video clip.

19. The non-transitory computer-readable storage medium of claim 11, wherein the game is a video game and the video clip is displayed using a game client that is also used to play the video game.

20. The non-transitory computer-readable storage medium of claim 11, wherein the video clip uses a third person perspective positioned to view an area where a portion of events of the play of the game took place.

* * * * *